United States Patent [19]

Van Manen

[11] Patent Number: 5,585,567
[45] Date of Patent: Dec. 17, 1996

[54] METHOD AND APPARATUS FOR DETERMINING THE INTERNAL PRESSURE OF A SEALED CONTAINER

[75] Inventor: Peter Van Manen, Worcester Park, England

[73] Assignee: The BOC Group plc, Windlesham, England

[21] Appl. No.: 434,230

[22] Filed: May 4, 1995

[30]   Foreign Application Priority Data

May 4, 1994 [GB] United Kingdom ............ 9408821

[51] Int. Cl.$^6$ .................................................. G01L 11/00
[52] U.S. Cl. ................................. 73/702; 73/52; 73/579
[58] Field of Search ............................ 73/579, 702, 52

[56]   References Cited

U.S. PATENT DOCUMENTS 3,802,252  4/1974  Hayward et al. .
4,399,514  8/1983  Hamasaki et al. ................ 364/558
5,144,838  9/1992  Tsuboi .

FOREIGN PATENT DOCUMENTS 1594052  3/1978  United Kingdom .

Primary Examiner—Hezron E. Williams
Assistant Examiner—Jay L. Politzer
Attorney, Agent, or Firm—David A. Draegert; Salvatore P. Pace

[57]   ABSTRACT

Apparatus (10) includes means (14) for exciting at least the fundamental radial circumferential mode of vibration ($f_1$) and the first harmonic ($f_2$) thereof, detection means (22) for detecting the vibration and analyzing means (12) for determining the internal pressure by reference to $f_1$ and $f_2$.

4 Claims, 4 Drawing Sheets

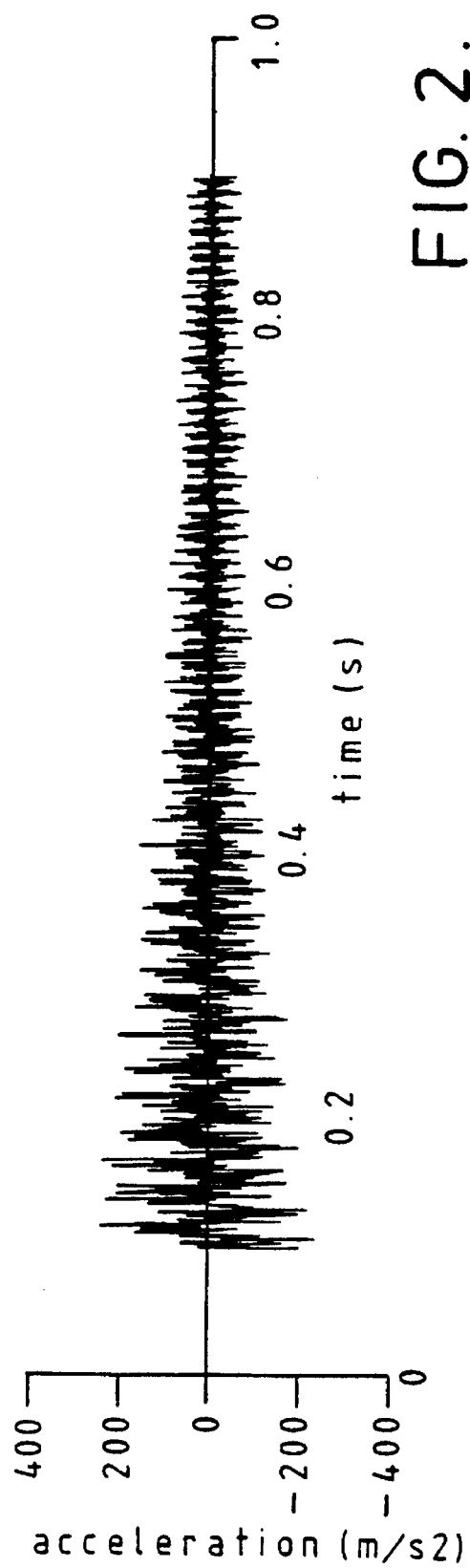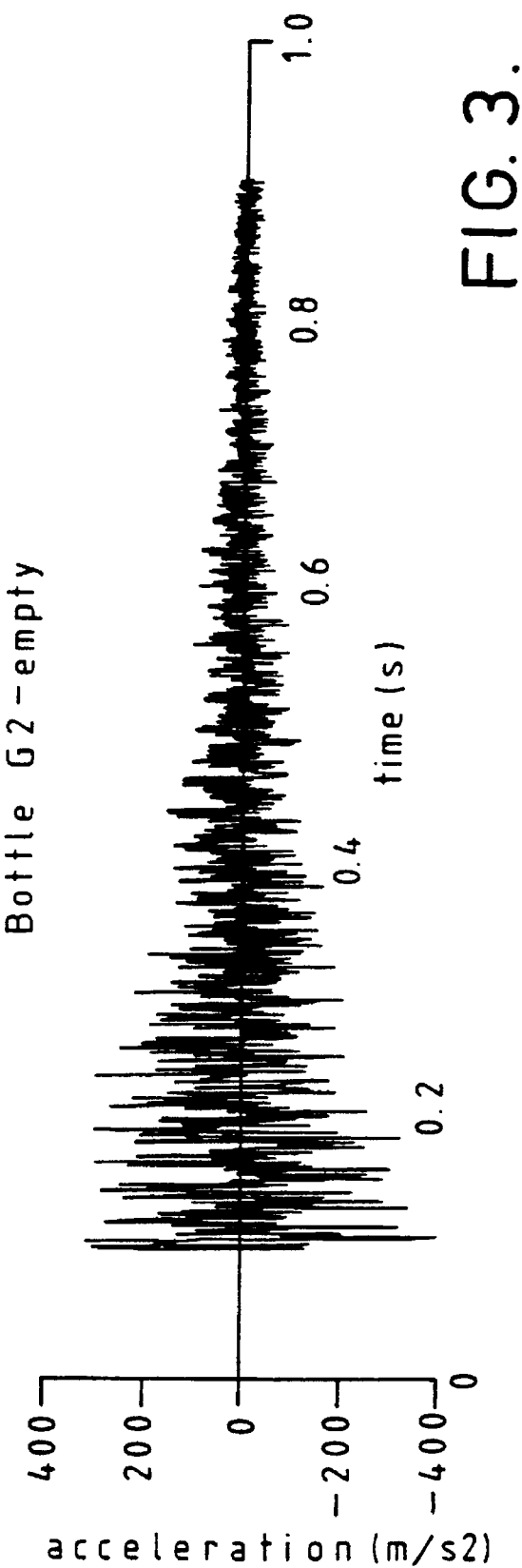

5,585,567

METHOD AND APPARATUS FOR DETERMINING THE INTERNAL PRESSURE OF A SEALED CONTAINER

TECHNICAL FIELD

The present invention relates to a method and apparatus for determining the internal pressure of a sealed container, and is more particularly concerned with a method and apparatus for non-destructively determining the internal pressure of a sealed gas bottle by analysing the vibratory mode thereof.

BACKGROUND OF THE INVENTION

Presently known methods of determining the internal pressure of a gas bottle include the use of a pressure gauge. The gauge is connected to the outlet of the bottle prior to the operation of a value which allows the gauge to communicate directly with the contents of the bottle and respond to the pressure therein. Such gauges, whilst providing a high degree of accuracy, when correctly fitted by a skilled operator, do not lend themselves to the speedy operation. This can cause undesirable delays when an operator is checking a large number of bottles. In fact, the accuracy of such gauges can be an immaterial advantage when, for example, it is merely desired to check whether the bottle is substantially full or substantially empty, thereby to avoid an empty bottle being despatched to a customer.

There therefore exists a requirement for a method of and apparatus for determining the internal pressure of a sealed container, such as a bottle, which is comparatively quick to use and which does not rely on the skill of the operator to ensure an accurate measurement. An additional requirement which the present invention aims to achieve is to provide an apparatus which is easily accommodated in the relatively small gap between closely packed bottles.

SUMMARY OF THE INVENTION

Accordingly, the present invention provides a non-invasive method of determining the pressure within a container comprising the steps of:

(a) storing container data into a memory;

(b) striking the container in a controlled manner so as to excite at least two modes of vibration having separate frequencies $f_1$ and $f_2$;

(c) detecting the vibration resulting from the striking of the container;

(d) producing a frequency spectrum of the detected vibration;

(e) isolating values of $f_1$ and $f_2$ from the frequency spectrum; and (f) calculating the internal pressure p from the stored data and isolated frequencies $f_1$ and $f_2$.

It will be appreciated that all the above mentioned calculations may be made by a simple calculating device and that, as a result of this, and the fact that the method avoids the problems associated with pressure gauges, it will be possible for an unskilled operator to undertake pressure measurement at comparatively high speed.

In another aspect of the present invention there is provided an apparatus for the non-invasive determination of pressure within a container, said apparatus comprising:

(a) means for receiving and storing basic container information;

(b) striking means for striking the container in a controlled manner so as to excite at least two modes of vibration having separate frequencies $f_1$ and $f_2$;

(c) detecting means for detecting vibration resulting from the striking of said container;

(d) isolating means for isolating values of $f_1$ and $f_2$; and (e) calculating means for calculating the internal pressure p from the stored information and isolated values of $f_1$ and $f_2$.

In preferred embodiments, the gas container is substantially a right circular cylinder and the first and second modes are the fundamental and first harmonic of the radial-circumferential modes.

BRIEF DESCRIPTION OF THE DRAWING

The present invention will now be more particularly described by way of example only with reference to the following drawings, in which;

FIGS. 2 and 3 are graphs of received vibration signals for a full and empty bottle, respectively;

DESCRIPTION OF THE PREFERRED EMBODIMENTS

Figure 1:
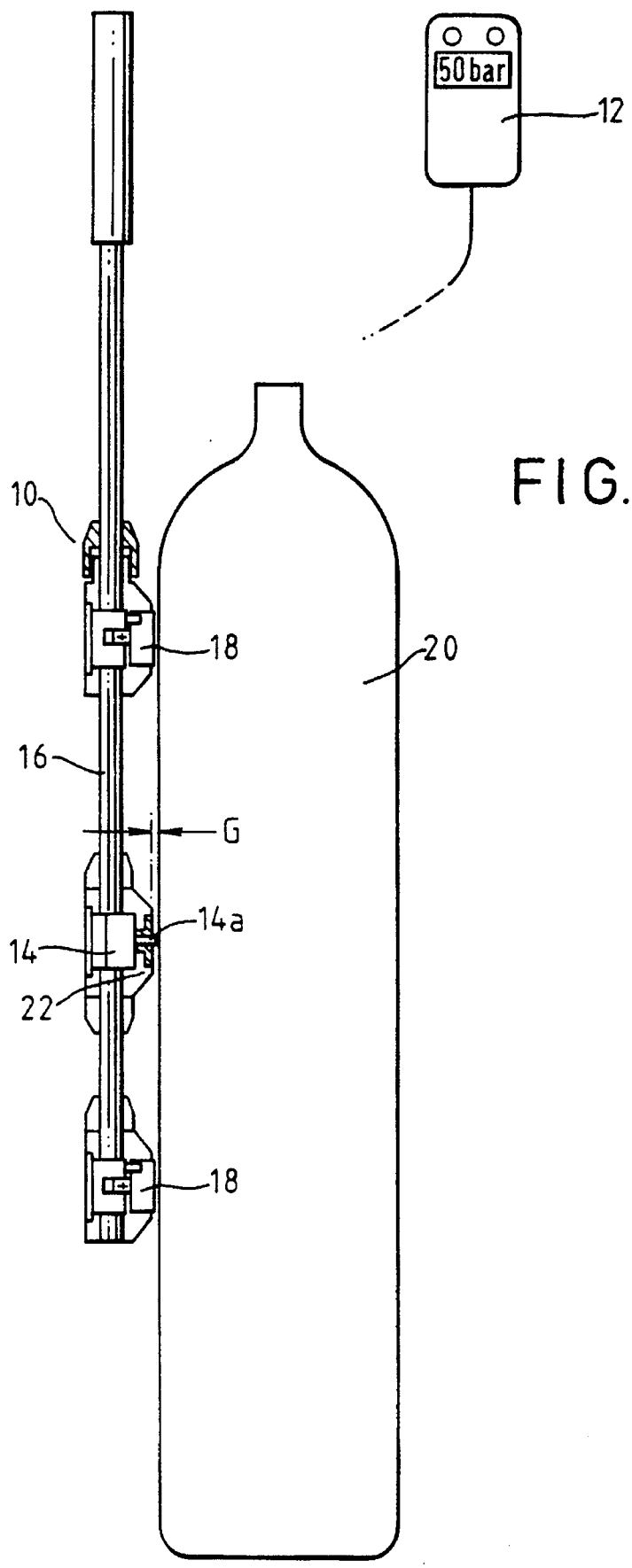
FIG. 1 is a side view of an apparatus according to the present invention shown attached to a bottle.
Figure 4:
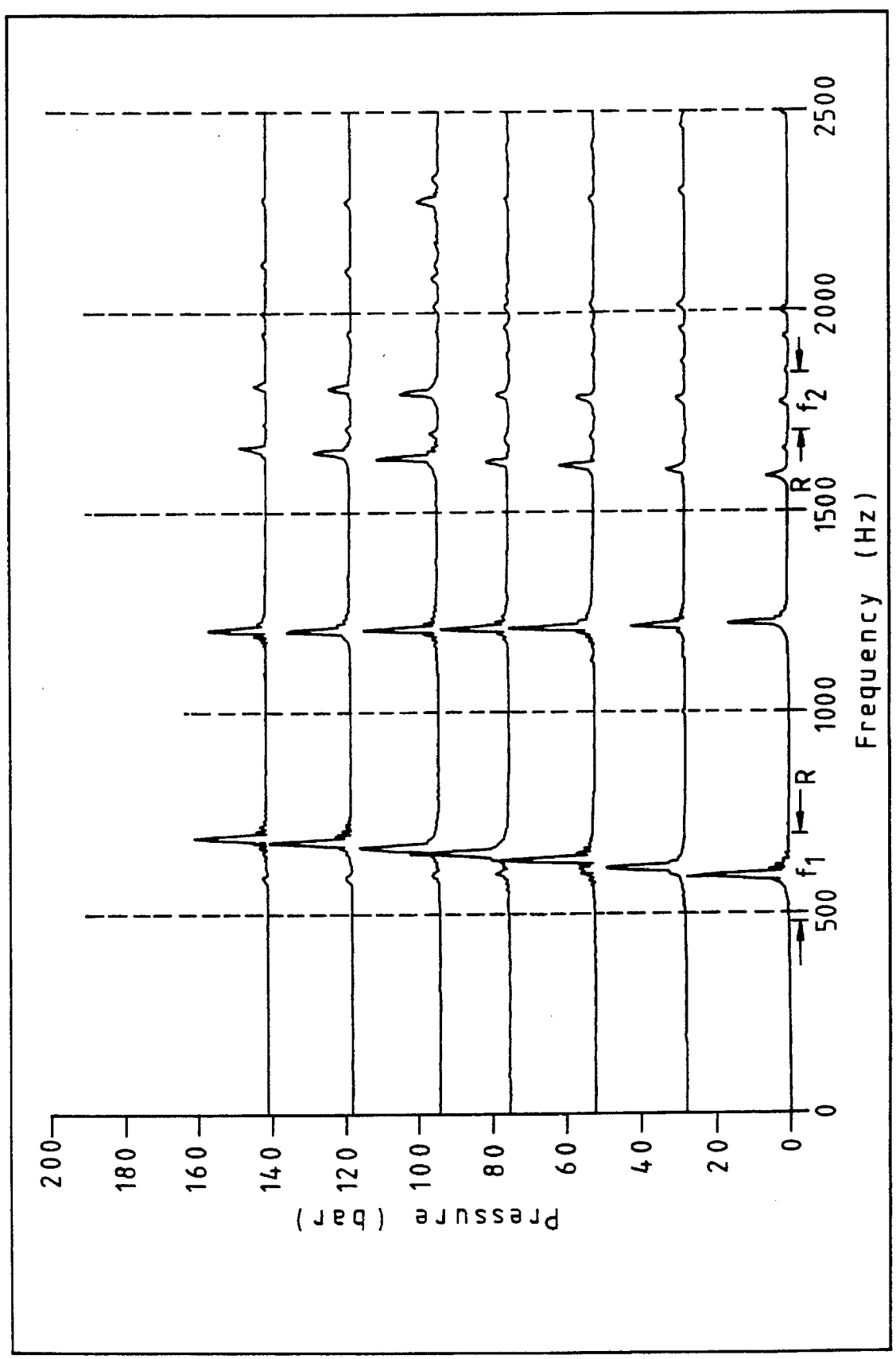
FIG. 4 is a graph of a vibration frequency spectrum for a bottle at various pressures.

Referring to FIG. 1, the apparatus 10 comprises a data storage and processing device, such as, for example, a hand held data acquisition unit 12 to be described in detail below, and a solenoid or manually activated striker 14. The striker 14 may be mounted on a support member 16 in the form of an elongate member or rod having one or more magnets 18 for securing the rod support member 16 to a bottle 20 to be tested. For convenience, one of said magnets may be slidable up and down said support member 16 so as to facilitate the accommodation of various sizes of bottle 20. The striker 14 is mounted relative to said support member 16 and magnets 18 so as to leave a gap G between the end 14a of the striker 14 and the bottle when said striker is in a retracted position. A signal detector in the form of accelerometer 22 is provided for detecting vibration within the bottle set up as a result of the operation of striker 14. The accelerometer is linked to the data acquisition unit 12 for the transfer of data thereto.

The data acquisition unit (DA Unit) 12 includes an analogue to digital converter, a memory to store captured and processed data, a processor for processing data in a manner to be described later herein, a simple keypad and display and a power supply. The DA Unit 12 may further include a capability for storing results and/or down-loading data over a serial communications link (not shown). Typically, the signal processing capability will include filtering by a low-pass digital filter with cut off set to about 3.5 kHz and means for conducting a fast Fourier transform on the data.

The present invention being particularly slim lends itself to insertion into the small gaps formed between closely packed cylindrical bottles. In which position the striker 14 is located towards the mid portion of the bottle so as to minimise the effects of the bottle ends on the pressure determining method.

Vibrational analysis of long, thin-walled cylinders is discussed in "Mechanical Vibrations", 4th Edition, Den Hartog, McGraw-Hill, N.Y., 1956. A preferred embodiment of the invention utilizes the fact that for a container that is substantially a right circular cylinder containing a gas at pressure p ($N/m^2$), the frequency $f_1$ (Hz) of the fundamental radial-circumferential mode is approximately $$f_1 = A + Bp \qquad (1)$$

where A and B are constants having dimensions $s^{-1}$ and $m^2/Ns$, respectively.

The constant A is given by $$A = C_1 \times \frac{0.49t}{d^2} \sqrt{\frac{E}{\rho}} \qquad (2)$$

where $C_1$ is a dimensionless correction factor to account for the effect of the ends of the container, E is the elastic modulus ($N/m^2$) of the container wall material, $\rho$ is the density ($kg/m^3$) of the container wall material, t is the thickness (m) of the container wall, and d is the diameter (m) of the cylindrical container.

The constant B is given by $$B = C_2 \times \frac{0.05d}{t^2} \sqrt{\frac{1}{\rho E}} \qquad (3)$$

where $C_2$ is another dimensionless correction factor to account for container end effects.

The frequency $f_1$ depends upon the wall thickness of the container. The accuracy of pressure measurements based only on $f_1$ are limited because gas bottles in commercial use having the same nominal dimensions vary in wall thickness. The accuracy can be increased by calculating the effective wall thickness of a given container from additional data, such as the actual frequency of a second vibrational mode. A preferred embodiment is based on the fact that the frequency $f_2$ of a second (first harmonic) radial-circumferential mode of vibration is given approximately by $$f_2 = kA + Bp \qquad (4)$$

or, from equation (1), $$f_2 = f_1 + (k-1)A \qquad (5)$$

Figure 5:
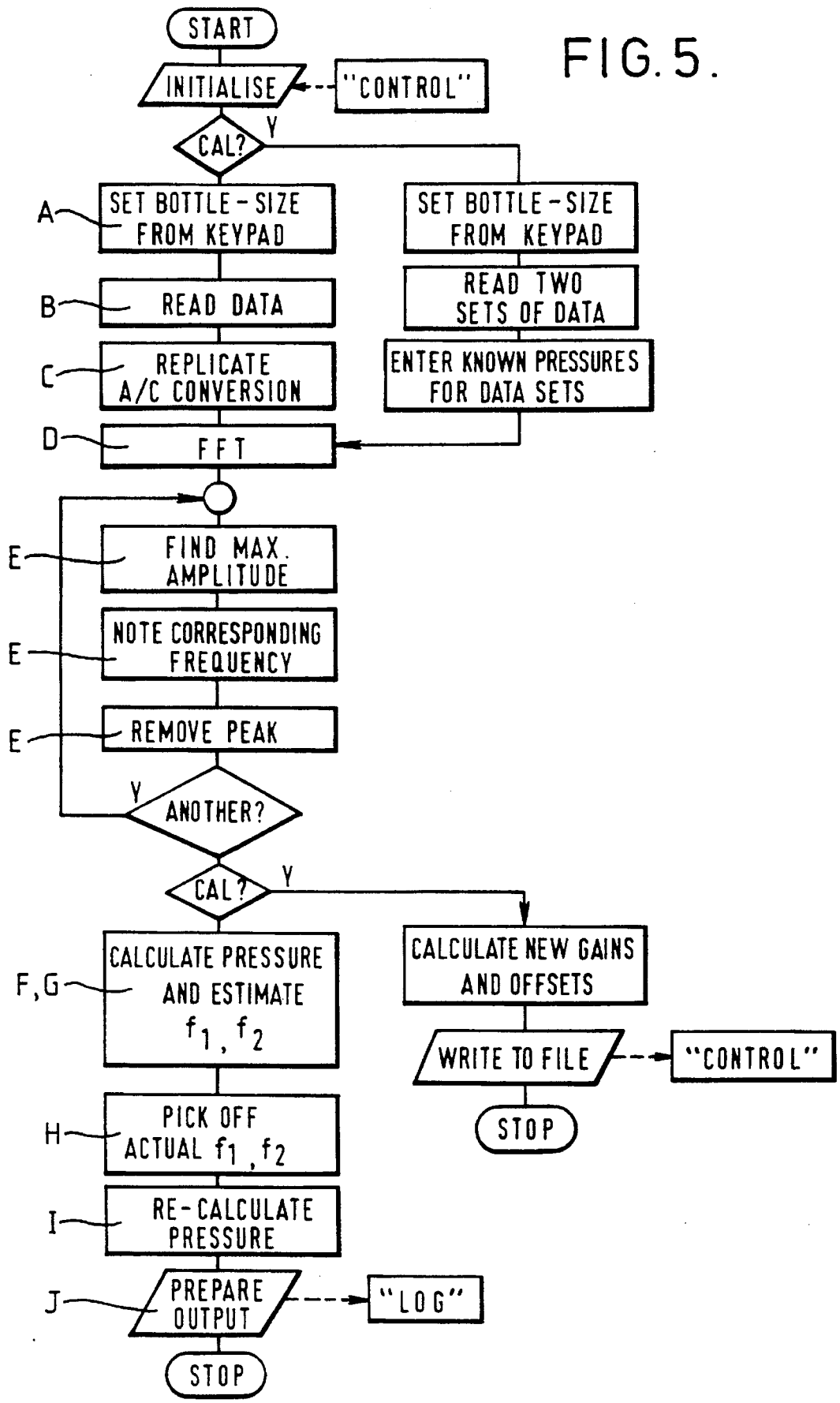
FIG. 5 is a flow diagram relating to the pressure calculation software.

The dimensionless factors $C_1$, $C_2$ and k and related gains and offsets (FIG. 5) can be determined experimentally by calibration measurements on cylinders containing a gas at known pressures. After calibration, an iterative technique may be used to identify experimental values of $f_1$ and $f_2$ that can be used to calculate the constants A and B and, ultimately, the gas pressure p from equation (1):

$$p = (f_1 - A)/B \qquad (6)$$

Referring now to FIGS. 1 to 5, the present apparatus 10 is operated by firstly selecting the appropriate bottle size from a range stored in the memory or imputing data manually thereby to access the basic data relating thereto (step A in FIG. 5); striking the bottle 20 with striker 14 so as to excite at least the fundamental radial-circumferential mode of vibration ($f_1$) and a harmonic ($f_2$) thereof; detecting the vibration (FIG. 2, 3) within the bottle 20 through accelerometer 22 (step B); filtering the received signal, conducting an analogue-to-digital conversion to between 8 and 12 bit resolution (step C) and presenting the converted signal to the DA Unit 12 for processing. Processing includes the steps of producing a frequency spectrum of the detected vibrations by means of, for example, a fast Fourier transformation technique (step D), and then isolating the values of $f_1$ and $f_2$ from other frequencies. Isolation of $f_1$ and $f_2$ may be conducted by selecting the ten most pronounced resonance peaks from the spectrum (step E) and searching for and identifying those peaks that correspond to the $f_1$ and $f_2$ peaks (step F and step G). The search and identify routine should be capable of recognizing and ignoring other natural frequencies; particularly large peaks, such as the first natural bending mode which is independent of internal pressure and may be detectable only for larger bottles. Preferably the search and identify routine involves the following steps:

(a) estimating a value of $f_1$ and then searching for the actual value of $f_1$ within a given range R of the estimated value (see FIG. 4), where the preferred estimate (from equation (1) with p=0) is $A_0$ calculated by (i) selecting a nominal value $t_0$ of container wall thickness from peviously stored or manually imputed data, and (ii) using the value of $t=t_0$ in equation (2) to calculate $A=A_0$; and (b) estimating a value of $f_2$ and then searching for the actual value of $f_2$ within a given range R of the estimated value (see FIG. 4), where for the first harmonic radial-circumferential mode the preferred estimate is $2.8 A_0 - f_1$.

Upon identification of the actual values of $f_1$ and $f_2$ (step H), the actual value of A may be calculated from equation (5) and the effective container wall thickness t may then be calculated from equation (2). The constant B may then be calculated from equation (3) and the pressure p within the container may be calculated (step I) from equation (6).

The results of the calculations may be presented to the operator (step J) via hand held DA Unit 12 or via a computer printout (not shown).

Clearly, it will be possible to adopt a number of different calculating methods and hence the present invention is not considered to be limited to those presented herein.

I claim:

1. A non-invasive method of determining the pressure within a container comprising a right-circular cylinder, the method comprising the steps of:

(a) storing container data into a memory;

(b) striking the container in a controlled manner so as to excite at least the fundamental radial-circumferential mode having a frequency $f_1$ and the first harmonic radial-circumferential mode having a separate frequency $f_2$;

(c) detecting the vibration resulting from the striking of the container;

(d) producing a frequency spectrum of the detected vibration;

(e) isolating values of $f_1$ and $f_2$ from the frequency spectrum;

(f) calculating the value of a constant A from the equation $$A = (f_2 - f_1)/(k-1)$$

(g) calculating an effective thickness t of the cylindrical wall of the container from the equation $$A = C_1 \times \frac{0.49t}{d^2} \sqrt{\frac{E}{\rho}}$$

(h) calculating a constant B from the following equation $$B = C_2 \times \frac{0.05d}{t^2} \sqrt{\left(\frac{1}{\rho E}\right)}$$

and then (i) calculating the pressure p within the container from the equation $$p = (f_1 - A)/B$$

in which t = the thickness (m) of the container wall,
d = the diameter (m) of the container,
E = the Elastic Modulus (N/m$^2$) of the container wall material,
$\rho$ = the density (kg/m$^2$) of the container wall material, and
$C_1$, $C_2$ and k are dimensionless factors.

2. A method as claimed in claim 1 in which at least one of $f_1$ and $f_2$ is isolated by searching within a pre-determined range of the frequency spectrum.

3. A method as claimed in claim 1 in which $f_1$ is isolated by first estimating a value of $f_1$ and then searching for the actual value of $f_1$ within a given range of said estimated value, the estimated $f_1$ being established equal to $A_0$ calculated by:

(a) selecting a nominal value of thickness ($t_0$) from stored data, and (b) calculating $$A_0 = C_1 \times \frac{0.49 t_0}{d^2} \sqrt{\frac{E}{\rho}}$$

4. A method as claimed in claim 3 in which $f_2$ is isolated by first estimating a value of $f_2$ for the first harmonic radial-circumferential mode and then searching for the actual value of $f_2$ within a given range of said estimated value, the estimated $f_2$ being established equal to $2.8 A_0 - f_1$, where $A_0$ is calculated in accordance with claim 6 and $f_1$ is the actual frequency of the fundamental radial-circumferential mode of vibration.

* * * * *